United States Patent
Komada et al.

[11] Patent Number: 5,932,369
[45] Date of Patent: Aug. 3, 1999

[54] HYDROGEN OCCLUDING ALLOY AND ELECTRODE MADE OF THE ALLOY

[75] Inventors: Norikazu Komada; Shinichiro Kakehashi; Mitsugu Matsumoto; Yoshitaka Tamo, all of Omiya, Japan

[73] Assignee: Mitsubishi Materials Corporation, Tokyo, Japan

[21] Appl. No.: 08/779,959

[22] Filed: Dec. 23, 1996

Related U.S. Application Data

[63] Continuation-in-part of application No. 08/692,757, Aug. 6, 1996, abandoned.

[30] Foreign Application Priority Data

Apr. 25, 1996 [JP] Japan .................................. 8-105092
Apr. 25, 1996 [JP] Japan .................................. 8-105096

[51] Int. Cl.$^6$ .................................................. H01M 4/38
[52] U.S. Cl. ........................... 429/59; 429/101; 429/223; 429/218.2; 420/900
[58] Field of Search ........................... 429/59, 101, 223; 420/900

[56] References Cited

U.S. PATENT DOCUMENTS

| | | | |
|---|---|---|---|
| 4,728,586 | 3/1988 | Venktesan et al. | 429/94 |
| 4,898,794 | 2/1990 | Doi et al. | 429/59 |
| 4,983,474 | 1/1991 | Doi et al. | 429/59 |

FOREIGN PATENT DOCUMENTS

| | | |
|---|---|---|
| 0 503686 A2/A3 | 9/1992 | European Pat. Off. . |
| 6-0241652 | 11/1985 | Japan . |
| 4-168239 | 6/1992 | Japan . |
| 4-188805 | 7/1992 | Japan . |
| 4-328256 | 11/1992 | Japan . |
| 5-287422 | 11/1992 | Japan . |
| 5-247568 | 8/1993 | Japan . |
| 6-306413 | 1/1994 | Japan . |
| 6-283169 | 10/1994 | Japan . |

OTHER PUBLICATIONS

"F–treatment effect on the hydriding properties of La–substituted $AB_2$ compound (Ti,Zr) $(Mn,Cr,Ni)_2$", Int'l. Symposium on Metal–Hydrogen Systems Fundamentals & Applns., Nov. 6–11, 1994, F.–J.Liu and S.Suda.

"Surface and metallographic microstructure of La–substituted $AB_2$ compound (Ti,Zr) $(Mn,Cr,Ni)_2$", Intl. Symposium on Metal–Hydrogen Systems Fundamentals & Applns., Nov. 6–11, 1994, F.–J. Liu, G.Sandrock and S.Suda.

"Activation behaviour of $ZrCrNiM_{0.05}$ metal hydride electrodes (M=La, Mm (misch metal), Nd)", Journal of Alloys and Compounds, 185, (1992) (no month) Soo–Ryoung Kim and Jai–Young Lee, pp. L1–L4.

Journals of Alloys and Compounds, 231 (Dec. 1995) pp. 392–396, Surface and metallographic microstructure of the La–added $AB_2$ compound (Ti, Zr) $(Mn, Cr, Ni)_2$, F.–J. Liu et al.

*Primary Examiner*—John S. Maples
*Attorney, Agent, or Firm*—Nikaido, Marmelstein, Murray & Oram LLP

[57] ABSTRACT

This invention provides a hydrogen occluding alloy exhibiting high absorption/desorption rates, and excellent initial activation, the alloy having a composition comprising, by wt %, 25% to 45% of Zr, 1% to 12% of Ti, 10% to 20 % of Mn, 2% to 12% of V, 0.5% to 5% of at least one rare earth element, preferably comprising La and/or Ce, optionally 0.1% to 4% of Hf, and a balance being Ni (25% or more of Ni) and unavoidable impurities. The alloy has a structure comprising: a main phase made of a Zr—Ni—Mn based alloy, numerous cracks, and a regenerated phase made of rare earth element-Ni type alloy, the regenerated phase being exposed on the surfaces of the cracks, as well as electrodes made of the alloy.

12 Claims, 3 Drawing Sheets

HYDROGEN OCCLUDING ALLOY AND ELECTRODE MADE OF THE ALLOY

This application is a continuation-in-part of U.S. patent application No. 08/692,757, filed Aug. 6, 1996, now abandoned, under attorney docket number P704-6006.

FIELD OF THE INVENTION

The present invention relates to a hydrogen occluding alloy exhibiting significantly high hydrogen absorption and desorption rates and excellent initial activation during practical use, for example, as electrodes of batteries.

BACKGROUND OF THE INVENTION

Hitherto, a variety of hydrogen occluding alloys have been suggested, as exemplified by a hydrogen occluding alloy disclosed recently in "INTERNATIONAL SYMPOSIUM REGARDING THE FOUNDATION AND APPLICATION OF METAL-HYDROGEN SYSTEMS", held on Nov. 6 to 11, 1994, in Fujiyoshida, Japan.

The foregoing hydrogen occluding alloy is a Ni—Zr based alloy having a composition according to the formula:

$Ti_{0.5-x/2}Zr_{0.5-x/2}La_xMn_{0.8}Cr_{0.8}Ni_{0.4}$, in which x=0.0–0.1.

Figure 3:
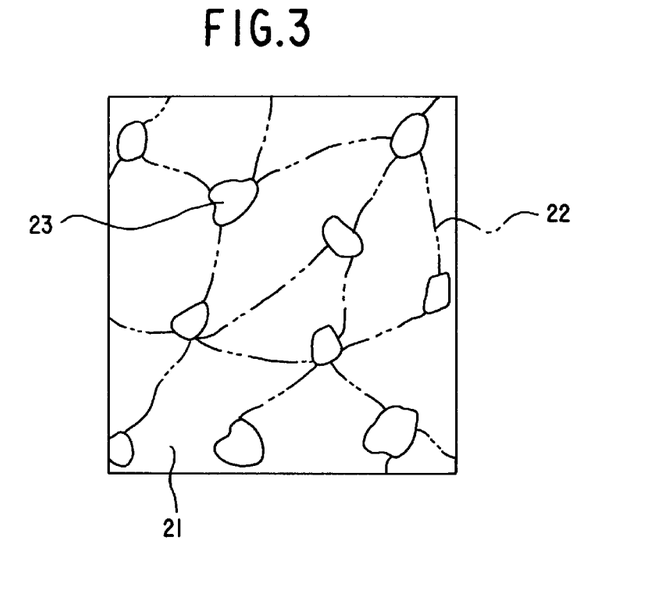
FIG. 3 is an enlarged schematic view of the structure of a conventional hydrogen occluding alloy.

Such alloys have a two-phase structure comprising a main phase made of a Zr—Ni—Mn based alloy and a phase made of a La—Ni type alloy which is dispersively distributed along the grain boundary of the main phase, as illustrated in an enlarged schematic view of the structure in FIG. 3.

In the foregoing conventional hydrogen occluding alloy, the phase made of the La—Ni type alloy dissociates atmospheric hydrogen molecules ($H_2$) to form hydrogen atoms (H) by its catalytic action, and absorbs the dissociated hydrogen atoms at a rate higher than that of the main phase made of the Zr—Ni—Mn based alloy; thus the absorption of the hydrogen atoms in the main phase made of the Zr—Ni—Mn based alloy is carried out mainly through the phase made of the La—Ni type alloy; and the hydrogen desorption is carried out by a function contrary to the foregoing function.

In addition, the foregoing conventional hydrogen occluding alloy can be made by preparing a Ni—Zr based liquid alloy having the foregoing composition, casting it into an ingot, and annealing the ingot for homogenization at a predetermined temperature within the range from 950 to 1,050° C. for a predetermined time in a nonoxidizing atmosphere, such as vacuum or inert gas.

In general, when the hydrogen occluding alloy is applied to an electrode of a battery, the battery can serve a practical use after an initial activation treatment in which charge/discharge cycles are repeated until the electrode including the hydrogen occluding alloy has a sufficient discharge capacity, in other words, until the discharge capacity caused by the hydrogen occluding alloy reaches near its maximum.

OBJECTS OF THE INVENTION

Meanwhile, there recently has been a great demand for large output, good performance, and energy saving with respect to batteries and heat pumps to which the hydrogen occluding alloy is widely applied. Therefore, there is a need for a hydrogen occluding alloy which has higher hydrogen absorption/desorption rates and a shorter initial activation time as compared with conventional hydrogen occluding alloys.

SUMMARY OF THE INVENTION

In the above viewpoint, the inventors of the present invention hereby provide hydrogen occluding alloys having improved hydrogen absorption/desorption rates and initial activation according to the following descriptions (a) and (b):

(a) A hydrogen occluding alloy comprising (all percentages herein, unless specified otherwise, are weight percentages):
25% to 45% of Zr, 1% to 12% of Ti,
10% to 20% of Mn, 2% to 12% of V,
0.5 to 5% of at least one rare earth element, preferably comprising La and/or Ce, preferably consisting of 50% or more of La and/or Ce, and more preferably, consisting essentially of La and/or Ce,
optionally 0.1% to 4% of Hf, and the balance being Ni (25% or more of Ni) and unavoidable impurities, preferably comprising:
25% to 40% of Zr, 4% to 12% of Ti,
10% to 20% of Mn, 2% to 8% of V,
0.5% to 5% of La and/or Ce,
optionally 0.1% to 2% of Hf,
and the balance being Ni (25% or more of Ni) and unavoidable impurities, more preferably comprising:
30% to 37% of Zr, 5% to 10% of Ti,
14% to 18% of Mn, 3% to 6% of V,
2% to 4% of La and/or Ce,
optionally 1% to 1.7% of Hf,
and the balance being Ni (25% or more of Ni) and unavoidable impurities, is obtained by mixing and melting Ni, Zr, Ti, Mn, V and rare earth (and optionally Hf) and casting to obtain ingots. By a subsequent homogenizing heat treatment at a temperature within the range of from 900° C. to 1100° C., for a period of not less than 1 hour, the ingots are provided with a structure comprising a main phase made of a Zr—Ni—Mn based alloy and a phase made of a rare earth element-Ni type alloy dispersively distributed along the grain boundary of the main phase. Further, following the foregoing homogenizing heat treatment, hydrogenation is carried out by heating in the range of from 200° C. to 950° C., preferably from 400° C. to 900° C. and more preferably from 600° C. to 700° C., for a period of not less than 30 minutes in a pressurized hydrogen atmosphere in the range of from 1 to 11 atm. (optionally followed by cooling—this cooling step is generally not necessary and can be omitted if desired). As a result, the phase made of a rare earth element-Ni type alloy preferentially reacts with the atmospheric hydrogen and changes to a hydride product phase comprising a rare earth element hydride and a rare earth element-Ni type alloy. Since the hydride product phase exhibits larger thermal expansion as compared with the main phase made of the Zr—Ni—Mn based alloy, numerous cracks starting from the hydride product phase are formed in the main phase such that the hydride product phase is exposed on the surfaces of the cracks.

The ingot is next subjected to a dehydrogenation step comprising holding the ingot in an atmosphere maintained at a temperature in the range of from 500° C. to 900° C., preferably from 550° C. to 850° C. and more preferably from 600° C. to 700° C., and a vacuum pressure (not greater than 10 Torr). During this dehydrogenation step, rare earth element hydride in the hydride product phase changes to rare earth element, and the new born rare earth element reacts with the coexisting rare earth element-Ni type alloy to form a regenerated phase made of the rare earth element-Ni type alloy.

Figure 1:
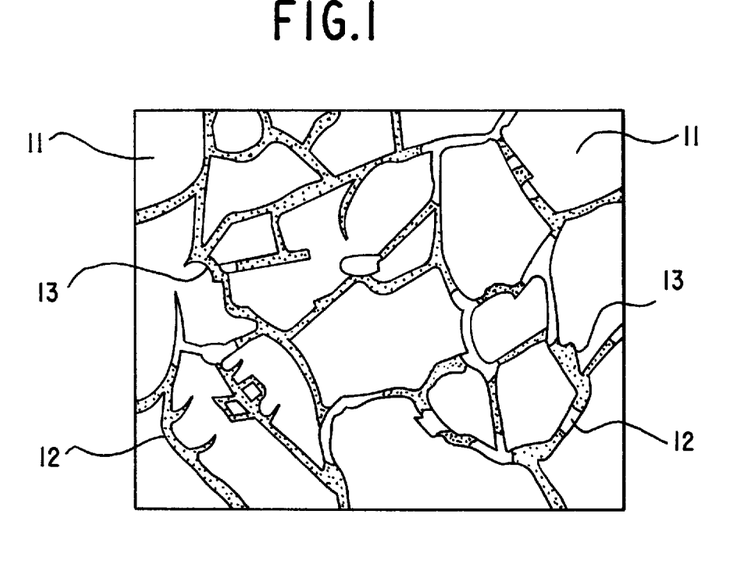
FIG. 1 is an enlarged schematic view of the structure of hydrogen occluding alloys 1 to 13, 33 to 53, 93, 94, 97 to 100 and 109 to 112, with no Hf, in accordance with the present invention.
Figure 2:
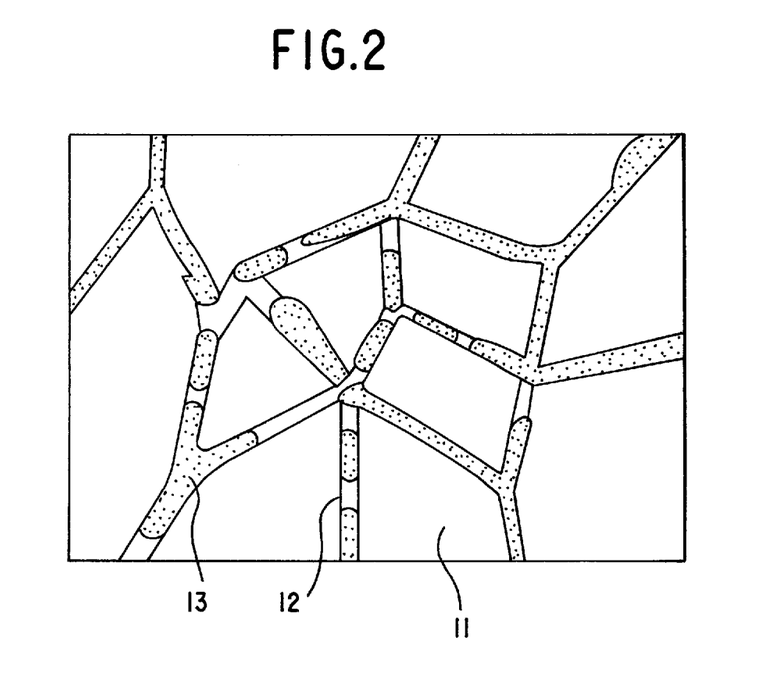
FIG. 2 is an enlarged schematic view of the structure of hydrogen occluding alloys 14 to 32, 54 to 92, 95, 96 and 101 to 108, with Hf, in accordance with the present invention.
Figure 5:
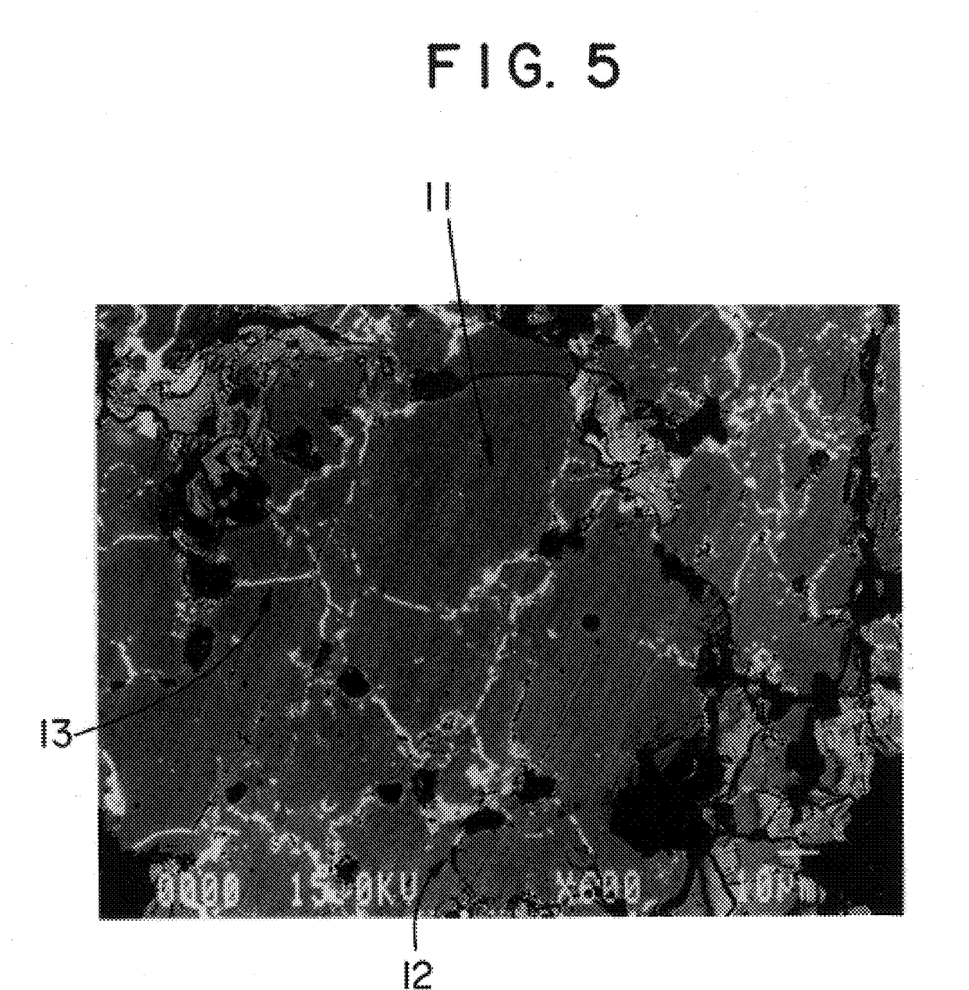
FIG. 5 is an SEM picture of a hydrogen occluding alloy in accordance with embodiment (a), discussed above.

Since the phase made of the rare earth element-Ni type alloy is fluidized during the regeneration, the phase distributes expansively along the cracks. As a result, there is obtained a structure comprising a main phase 11 made of the Zr—Ni—Mn based alloy, numerous cracks 12 formed during hydrogenation of the rare earth element-Ni type alloy, and a regenerated phase 13 made of a rare earth element-Ni type alloy phase being distributed as a result of flowing along the cracks during the dehydrogenation step, as shown in FIGS. 1 and 2 which are enlarged schematic views, and FIG. 5, which is an SEM picture, of the structure of the alloy of an embodiment in accordance with the present invention. In FIG. 5, there are identified a piece of main phase 11, a piece of regenerated phase 13 (which is white), and a crack 12 (just under another piece of white regenerated phase).

(b) In the Zr—Ni—Mn based alloy described in (a), the regenerated phase made of the rare earth element-Ni alloy as one component catalytically dissociates atmospheric hydrogen molecules ($H_2$) to form hydrogen atoms (H), and absorbs the dissociated hydrogen atoms at a higher rate as compared with the main phase made of the Zr—Ni—Mn based alloy. Thus, the hydrogen absorption in the main phase is carried out mainly through the regenerated phase made of the rare earth element-Ni type alloy and the desorption is carried out by the function contrary to the foregoing function. Since the regenerated phase made of the rare earth element-Ni type alloy flows expansively along the numerous cracks, the effective area significantly increases. Thus, the regenerated phase can absorb and desorb hydrogen atoms at rates higher than those of the conventional hydrogen occluding alloy. Further, initial activation is significantly promoted because the absorption of hydrogen atoms at the initial activation is carried out through the regenerated phase made of the rare earth element-Ni type alloy having such large effective area.

In accordance with the present invention as described in (a) and (b) above, the hydrogenation step can be conducted immediately after the homogenization step, with or without cooling. Alternatively, the hydrogenation step can be conducted any time after the homogenization step, i.e., with a time period between the two steps. For example, if desired, the ingot can be cooled e.g., to room temperature between the two steps, or the ingot can be transferred directly from the homogenization step to the hydrogenation step without cooling.

As mentioned above, the matrix phase of the alloys in accordance with the present invention as described above in (a) and (b) have numerous cracks. These cracks are generally of varying size, and the matrix phase has at least about 100 cracks having a major dimension which exceeds 0.1 micrometers per square millimeter.

The present invention was achieved based on the results set forth above, and is characterized by a hydrogen occluding alloy exhibiting high hydrogen absorption and desorption rates and excellent initial activation. The hydrogen occluding alloy has a composition comprising:

25% to 45% of Zr, 1% to 12% of Ti,

10% to 20% of Mn, 2% to 12% of V, 0.5 to 5% of at least one rare earth element, preferably comprising La and/or Ce, preferably consisting of 50% or more of La and/or Ce, and more preferably, consisting essentially of La and/or Ce, optionally 0.1% to 4% of Hf, and the balance being Ni (25% or more of Ni) and unavoidable impurities, preferably comprising:

25% to 40% of Zr, 4% to 12% of Ti,

10% to 20% of Mn, 2% to 8% of V, 0.5% to 5% of La and/or Ce, optionally 0.1% to 2% of Hf, and the balance being Ni (25% or more of Ni) and unavoidable impurities, and more preferably comprising:

30% to 37% of Zr, 5% to 10% of Ti,

14% to 18% of Mn, 3% to 6% of V,

2% to 4% of La and/or Ce, optionally 1% to 1.7% of Hf, and the balance being Ni (25% or more of Ni) and unavoidable impurities;

and following heat treating said alloy for homogenizing at a temperature within the range of from 900° C. to 1100° C., for a period of not less than 1 hour, hydrogenation ("HD") by heating in the range of from 200° C. to 950° C., preferably from 400° C. to 900° C. and more preferably from 600° C. to 700° C. for a period of not less than 30 minutes in a pressurized hydrogen atmosphere in the range of from 1 to 11 atm., and dehydrogenation ("DR") by holding in an atmosphere maintained at a temperature in the range of from 500° C. to 900° C., preferably from 550° C. to 850° C. and more preferably from 600° C. to 700° C. and a vacuum pressure not greater than 10 Torr so that the alloy has a structure comprising:

a main phase made of a Zr—Ni—Mn based alloy, numerous cracks formed at the time when the rare earth element hydride is generated, and a regenerated phase made of a rare earth element-Ni type alloy being exposed on the surfaces of the cracks.

"Zr—Ni—Mn based alloy" refers to an alloy whose approximate formula is $(Zr, Ti)(Ni, Mn, V)_2$.

As used herein, "rare earth element(s)-Ni type alloy" (or, e.g., "La—Ni type alloy") refers to an alloy which may include small amounts of materials other than rare earth and Ni, e.g., a suitable rare earth element(s)-Ni type alloy may consist of 71.0–78.6% La, 21.2–28.8% Ni, and <0.4% other materials.

The reason the composition of the hydrogen occluding alloy according to the present invention is limited to the foregoing ranges will now be described.

(a) Zr

The Zr component forms the main phase in association with Ni and Mn to increase the amount of the hydrogen occluded as described above. When the Zr content is less than 25%, the desired amount of hydrogen cannot be occluded. Whereas, if the content exceeds 45%, the amount of hydrogen occluded by the alloy decreases. Therefore, the Zr content is determined to be 25% to 45%, preferably 25% to 40% and more preferably 30% to 37.

(b) Ti

The Ti component, dissolved in the main phase set forth above, lowers the equilibrium pressure for dissociating hydrogen to a level lower than the atmospheric pressure at room temperature, for example, so that the component promotes the hydrogen absorption/desorption and increases the amount of hydrogen occluded. If the Ti content is less than 1%, the desired effect as set forth above cannot be achieved. On the other hand, when the content exceeds 12%, the equilibrium pressure for dissociating hydrogen is again raised to, for example, a level higher than the atmospheric pressure at room temperature. As a result, the hydrogen absorption/desorption decreases. Therefore, the Ti content is determined to be 1% to 12%, and preferably 4% to 12% and more preferably 5% to 10%.

(c) Mn

The Mn component forms the main phase made of the Zr—Ni—Mn based alloy which occludes hydrogen as set forth above. When the Mn content is less than 10%, the main phase does not achieve the desired hydrogen-occluding capacity, whereas an Mn content over 20% suppresses the hydrogen absorption/desorption capability. Therefore, the content is determined to be 10% to 20%, and preferably, 14% to 18%.

(d) V

The V component dissolved in the main phase stabilizes absorption/desorption of hydrogen by adjusting the equilibrium pressure for dissociating hydrogen and increases the quantity of occluded hydrogen. If the V content is less than 2%, the desired effect set forth above cannot be achieved, whereas a content exceeding 12% does not bring about further improvement in such effects. Therefore, the content is determined to be 2% to 12%, and preferably 2% to 8% and more preferably 3% to 6%.

(e) Rare earth element(s)

This component(s) is/are essential for the formation of the regenerated phase made of the rare earth element-Ni type alloy which dissociates to absorb atmospheric hydrogen at a higher rate than that of the main phase and desorbs to recombine hydrogen to the atmosphere, as described above. If the content is less than 0.5%, the resulting amount of the regenerated phase made of the rare earth element-Ni type alloy is too small to maintain such functions. On the other hand, since a content exceeding 5% causes an excessive amount of the phase made of the regenerated rare earth element-Ni type alloy, the amount of hydrogen that can be occluded into the overall alloy decreases unsatisfactorily. Therefore, the content is determined to be 0.5% to 5% and preferably 2% to 4%.

To enhance the effects of the rare earth element-Ni type alloy and the regenerated phase made of the rare earth element-Ni type alloy, it is preferred that the rare earth element comprise La and/or Ce, preferably consist of 50% or more of La and/or Ce, and more preferably, consist essentially of La and/or Ce.

(f) Hf

The Hf content (Hf is optional), when present, which forms a main phase made of a Zr—Ni—Mn based alloy along with the Zr component, enhances the effects set forth above. If the Hf content is less than 0.1%, the desired effect cannot be obtained, whereas if the content exceeds 4%, the above function of the Zr content is impaired. Therefore, when Hf is present, the content is determined to be 0.1% to 4%, preferably 0.1% to 2% and more preferably 1% to 1.7%.

(g) Ni

If the Ni content is less than 25%, rare earth element-Ni type alloy and the regenerated rare earth element-Ni type alloy cannot be sufficiently formed. Since such alloy does not exhibit a desired hydrogen discharge rate and initial activation, the content is determined to be at least 25%.

(h) HD

If the hydrogenation temperature is less than 200° C., the phase made of a rare earth element-Ni type alloy does not react enough with the atmospheric hydrogen to change to a hydride product phase comprising a rare earth element hydride and a rare earth element-Ni type alloy.

If the hydrogenation temperature exceeds 950° C., the hydride product phase does not exhibit the desired thermal expansion. As a result, numerous cracks starting from the hydride product phase are not formed in the main phase.

Therefore, the hydrogenation temperature is determined to be 200° C. to 950° C., preferably 400° C. to 900° C. and more preferably 600° C. to 700° C.

(i) DR

If the dehydrogenation temperature is less than 500° C., the new born rare earth element does not react enough with the coexisting rare earth element-Ni type alloy to form a regenerated phase made of the rare earth element-Ni type alloy.

If the dehydrogenation temperature exceeds 900° C., the regenerated phase made of the rare earth element-Ni type alloy does not distribute expansively along the cracks.

Therefore, the dehydrogenation temperature is determined to be 500° C. to 900° C., preferably 550° C. to 850° C. and more preferably 600° C. to 700° C.

The hydrogen occluding alloy in accordance with the present invention can be used as powder having a predetermined particle size by any conventional mechanical pulverization. In addition, the alloy can also be pulverized by a hydrogenation process in which hydrogen is absorbed at a given temperature ranging from 10 to 200° C. and desorbed by evacuation.

DETAILED DESCRIPTION OF PREFERRED EMBODIMENTS

The hydrogen occluding alloy in accordance with the present invention will now be described in further detail by an embodiment.

In an ordinary high-frequency induction melting furnace, Ni, Zr, Ti, Mn, V, La, Ce, Cr and Hf, as well as misch metal, each having a purity higher than 99.9%, are melted in an Ar atmosphere to prepare alloys having compositions as shown in Tables 1, 3, 5, 7, 9, 11, 13, 15, 17 and 19. Each alloy is cast in a water-cooled copper casting mold to be formed into an ingot. Each of the ingots is heated for homogenization under vacuum at a predetermined temperature within the range of from 900° C. to 1100° C. for 20 hours.

After the ingot is maintained at room temperature for 1 hour in a hydrogen atmosphere of a pressure in the range of from 1 to 1.2 atm., it is heated to a predetermined temperature within a range of from 200° C. to 950° C. and subjected to a hydrogenation treatment at the predetermined temperature for 30 minutes, so that the phase made of the rare earth element-Ni type alloy, which distributes along the grain boundary of the main phase made of the Zr—Ni—Mn based alloy, is converted into the hydride product phase mainly including rare earth element hydride and the rare earth element-Ni type alloy, where numerous cracks start from the hydride product phase. After the hydrogenation at a predetermined temperature within the range of from 200° C. to 950° C., preferably from 400° C. to 900° C. and more preferably from 600° C. to 700° C., the ingot is subjected to dehydrogenation at a predetermined temperature within the range of from 500° C. to 900° C., preferably from 550° C. to 850° C. and more preferably from 600° C. to 700° C. while evacuating until reaching a vacuum of $10^{-5}$ Torr, so that the phase made of the rare earth element-Ni type alloy is regenerated from the hydride product phase. Since the product is fluidized during the dehydrogenation process, the phase made of the regenerated rare earth element-Ni type alloy distributes expansively along numerous cracks as shown in FIG. 1 and 2. In such a way, hydrogen occluding alloys 1 to 92 and 97–112 in accordance with the present invention (hereinafter called "alloys of the present invention") are prepared. Alloys 93–96 are prepared in a similar way, except that after the hydrogenation step, they are cooled.

For comparison, comparative hydrogen occluding alloys having compositions as shown in Tables 3, 5, 9 and 15 are prepared under the same conditions as those described above, except that the hydrogenation and dehydrogenation processes following the homogenizing heat treatment are omitted.

The comparative alloy has a structure consisting of a matrix phase 21 made of a Zr—Ni—Mn based alloy and a dispersed phase 23 made of an La—Ni type alloy and disctibuted along the grain boundary 22 of the matrix phase, as shown in FIG. 3.

Then, the hydrogen absorption rate and the hydrogen desorption rate of each of the alloys 1 to 112 of the present invention and the comparative alloys are measured in accordance with JIS-H7202 "Method for Measuring Hydrogenation Rate of Hydrogen Occluding Alloy".

Prior to the measurement, alloys 1 to 112 of the present invention and the comparative alloys are respectively enclosed in a pressure container and subjected to hydrogenation pulverization including hydrogen absorption in a hydrogen atmosphere of 8 atm. at 200° C. for one hour, and the hydrogen desorption by evacuation to prepare powders having a particle size of 200 mesh or less.

Figure 4:
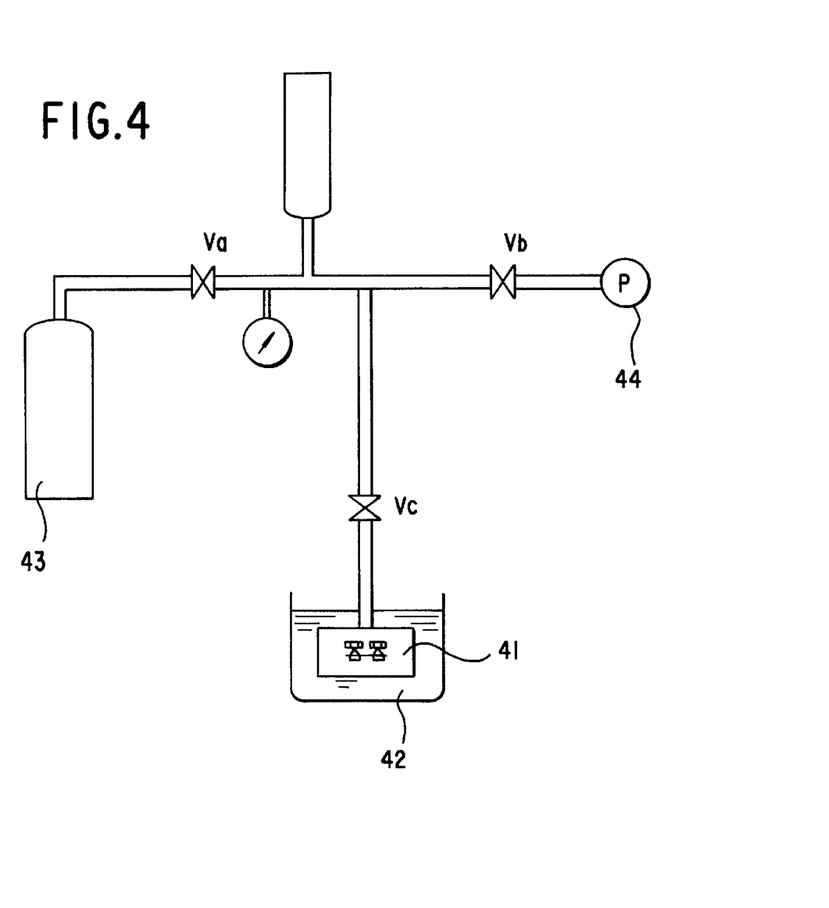
FIG. 4 is a schematic view of the apparatus used for measuring the hydrogen absorption/desorption rates of the hydrogen occluding alloy.

First, the hydrogen-absorption rate is, as illustrated in a schematic view in FIG. 4, measured as follows: (a) Powder is enclosed in a container 41 immersed in a (oil or water) bath 42, then a valve Vb is closed and valves Va and Vc are opened while maintaining the temperature in the bath at 200° C. in order to introduce pressurized hydrogen into the system from a hydrogen cylinder 43. When the pressure in the system reaches 30 atm., the valve Va is closed and the system is then allowed to stand until the pressure in the system decreases to a predetermined level (until the hydrogen absorption is completed). Thus, the powder is initially activated. (b) After the pressure in the system decreases to a predetermined level (around 20 atm.), the valve Vb is opened, followed by lowering the pressure in the system to $10^{-2}$ Torr by a vacuum pump 44. The bath temperature is lowered to 20° C. and the valves Vb and Vc are closed and the valve Va is opened to introduce hydrogen into the system, except for the container. When the pressure is raised to 30 atm., the valve Va is closed and the valve Vc is opened. In such a state, the pressure drop in the system with respect to time is measured. The quantity of occluded hydrogen at the point when the quantity of hydrogen occluded by powder reaches 80%, and time taken to the foregoing moment are obtained from the pressure-drop curve so that (the quantity of occluded hydrogen when the occlusion of 80 % is realized)/(the time taken to realize the occlusion of 80%) is calculated. The thus-obtained value is defined as the hydrogen absorption rate.

The hydrogen desorption rate is determined by the following procedure: The bath is maintained at a temperature of, for example, 120° C., appropriate for hydrogen desorption within a range of from 100° C. to 300° C. in a state in which the measurement of the hydrogen absorption rate has been completed, that is, in a state in which the valves Va and Vb are closed, the valve Vc is opened, and the pressure in the system reaches a predetermined level (Usually around 20 atm.). Then, the valve Vb is opened and the valve Vc is closed, and in the foregoing state, the pressure in the system, except for the container 41, is evacuated to $10^{-2}$ Torr. Then, the valve Vb is closed and the valve Vc is opened, and in this state, the pressure rise in the system with respect to time is measured. The quantity of desorbed hydrogen at the point when the quantity of hydrogen desorbed from powder reaches 80%, and time taken to the foregoing moment are obtained from the pressure-rise curve so that (the quantity of desorbed hydrogen when the desorption of 80% is realized)/ (the time taken to realize the desorption of 80%) is calculated. The thus-obtained value is defined as the hydrogen desorption rate. The results are shown in Tables 2, 4, 6, 8, 10, 12, 14, 16, 18 and 20.

For the purpose of evaluating the initial activation of alloys 1 to 112 of the present invention and conventional alloy, each alloy is used for an active material of a battery in the powder state, and the battery is subjected to repeat charge/discharge cycles until the battery shows a maximum discharge capacity as shown below in detail. The initial activation is taken as the number of charge/discharge cycles at which the discharge capacity corresponds to 95% of the maximum discharge capacity.

The conventional alloy is roughly crushed to form coarse particles of 2 mm or less in diameter with a jaw crusher, and each of alloys 1 to 112 of the present invention and roughly crushed conventional alloy is finely ground to 200 mesh or less with a ball mill. After water, polytetrafluoroethylene (PTFE) as a binder and carboxymethyl cellulose (CMC) as a thickener are added into each powder to obtain a paste, the paste is loaded on a commercial foamed nickel plate having a porosity of 95%. The foamed nickel plate is dried, pressed, and shaped into a cut plate of 30 by 40 mm having a thickness of 0.40 to 0.43 mm. The amount of the loaded active material is approximately 1.8 g. A nickel thin plate as a lead is welded at a side of the cut plate to form a negative electrode. On the other hand, a positive electrode is formed by preparing a paste from $Ni(OH)_2$ as an active material, water, polytetrafluoroethylene (PTFE) as a binder and carboxymethyl cellulose (CMC) as a thickener; loading the paste on the foamed nickel plate; drying, pressing and shaping the foamed nickel plate into a cut plate of 30 by 40 mm having a thickness of 0.71 to 0.73 mm; and welding the nickel thin plate at a side of the cut plate. The positive electrodes are provided at both sides of the negative electrodes through separators made of a polypropylene/polyethylene copolymer, and, protecting plates made of polyvinyl chloride are integrated therewith at both sides of the positive electrodes to prevent the omission of the active material from the outside of the positive electrodes.

1 The battery, whose electrode has component composition shown in samples 1–13, is fabricated by inserting thus-obtained integrated electrodes into a cell made of polyvinyl chloride and pouring a 35% KOH aqueous solution, as an electrolyte solution, into the cell.

The resultant battery is subjected to charge/discharge cycles under conditions of a charging rate of 0.20 C, a discharging rate of 0.20 C and a quantity of charged capacity corresponding to 135% of the negative electrode capacity. The charge/discharge cycles are repeated until the battery exhibits the maximum discharge capacity, in which one cycle of charge and discharge is counted as one charge/discharge.

Tables 2 and 4 show the maximum discharge capacity obtained by the procedure set forth above, as well as the number of charge/discharge cycles as a measure evaluating the initial activation, at which the discharge capacity is 95% of the maximum discharge capacity.

2 The battery, whose electrodes have component compositions shown in samples 14–32, is fabricated by inserting thus-obtained integrated electrodes into a cell made of polyvinyl chloride and pouring a 35% KOH aqueous solution, as an electrolyte solution, into the cell.

The resulting battery is subjected to charge/discharge cycles under conditions of a charging rate of 0.20 C, a discharging rate of 0.22 C, and a quantity of charged capacity corresponding to 135% of the negative electrode capacity. The charge/discharge cycles are repeated until the battery exhibits the maximum discharge capacity, in which one cycle of charge and discharge is counted as one charge/discharge.

Tables 4 and 6 show the maximum discharge capacity obtained by the procedure set forth above, as well as the number of charge/discharge cycles as a measure evaluating the initial activation, at which the discharge capacity is 95% of the maximum discharge capacity.

3 The battery, whose electrode has component composition shown in samples 33–92, is fabricated by inserting thus-obtained integrated electrodes into a cell made of polyvinyl chloride and pouring a 30% KOH aqueous solution, as an electrolyte solution, into the cell.

The resulting battery is subjected to charge/discharge cycles under conditions of a charging rate of 0.15 C, a discharging rate of 0.15 C, and a quantity of charged capacity corresponding to 135% of the negative electrode capacity. The charge/discharge cycles are repeated until the battery exhibits the maximum discharge capacity, in which one cycle of charge and discharge is counted as one charge/discharge.

Tables 6, 8, 10, 12, 14 and 16 show the maximum discharge capacity obtained by the procedure set forth above, as well as the number of charge/discharge cycles as a measure evaluating the initial activation, at which the discharge capacity is 95% of the maximum discharge capacity.

4 The battery, whose electrode has component composition shown in samples 93–96, is fabricated by inserting thus-obtained integrated electrodes into a cell made of polyvinyl chloride and pouring a 30% KOH aqueous solution, as an electrolyte solution, into the cell.

The resulting battery is subjected to charge/discharge cycles under conditions of a charging rate of 0.15 C, a discharging rate of 0.15 C, and a quantity of charged capacity corresponding to 135% of the negative electrode capacity. The charge/discharge cycles are repeated until the battery exhibits the maximum discharge capacity, in which one cycle of charge and discharge is counted as one charge/discharge.

Table 16 shows the maximum discharge capacity obtained by the procedure set forth above, as well as the number of charge/discharge cycles as a measure evaluating the initial activation, at which the discharge capacity is 95% of the maximum discharge capacity.

5 The battery, whose electrode has component composition shown in samples 97–112, is fabricated by inserting thus-obtained integrated electrodes into a cell made of polyvinyl chloride and pouring a 30% KOH aqueous solution, as an electrolyte solution, into the cell.

The resulting battery is subjected to charge/discharge cycles under conditions of a charging rate of 0.15 C, a discharging rate of 0.15 C, and a quantity of charged capacity corresponding to 135% of the negative electrode capacity. The charge/discharge cycles are repeated until the battery exhibits the maximum discharge capacity, in which one cycle of charge and discharge is counted as one charge/discharge.

Tables 18 and 20 show the maximum discharge capacity obtained by the procedure set forth above, as well as the number of charge/discharge cycles as a measure evaluating the initial activation, at which the discharge capacity is 95% of the maximum discharge capacity.

Results in Tables 2, 4, 6, 8, 10, 12, 14, 16, 18 and 20 evidently demonstrate that each of alloys 1 to 112 of the present invention exhibits higher hydrogen absorption and desorption rates by the effect of the regenerated phase made of the rare earth element-Ni type alloy having a wide effective area since the phase distributes expansively while flowing along numerous cracks, compared with the conventional alloy having the phase made of the La—Ni type alloy dispersively distributed along grains, resulting in an improvement in the initial activity.

As described above, since the hydrogen occluding alloy in accordance with the present invention exhibits significantly high hydrogen absorption/desorption rates, and excellent initial activity, it significantly contributes to the achievement of high output, high performance, and energy savings in various mechanical apparatuses.

TABLE 1

| Sample | Component Composition (wt %) | | | | | | | | | |
| | | | | | Rare Earth Elements | | | | | Ni + |
| No. | Zr | Ti | Mn | V | La | Ce | Pr | Nd | Hf | impurity |
| --- | --- | --- | --- | --- | --- | --- | --- | --- | --- | --- |
| 1 | 30.1 | 6.2 | 15.8 | 5.0 | — | 3.3 | — | — | — | Bal. |
| 2 | 34.3 | 5.6 | 16.0 | 4.9 | 3.0 | — | — | — | — | Bal. |
| 3 | 36.9 | 5.1 | 16.2 | 5.0 | 1.6 | 1.4 | — | — | — | Bal. |
| 4 | 34.4 | 9.8 | 15.9 | 5.1 | 2.9 | — | — | — | — | Bal. |
| 5 | 34.9 | 5.9 | 10.4 | 4.7 | 2.8 | — | — | — | — | Bal. |
| 6 | 34.1 | 6.2 | 17.9 | 4.9 | — | 3.1 | — | — | — | Bal. |
| 7 | 35.3 | 5.8 | 19.8 | 5.1 | — | 3.5 | — | — | — | Bal. |
| 8 | 34.6 | 6.0 | 16.2 | 2.8 | 1.6 | 1.3 | — | — | — | Bal. |
| 9 | 34.2 | 5.8 | 16.0 | 5.2 | 0.54 | — | — | — | — | Bal. |

TABLE 1-continued

| Sample No. | Component Composition (wt %) | | | | | | | | | Ni + impurity |
|---|---|---|---|---|---|---|---|---|---|---|
| | Zr | Ti | Mn | V | Rare Earth Elements | | | | | |
| | | | | | La | Ce | Pr | Nd | Hf | |
| 10 | 34.1 | 5.9 | 15.9 | 4.9 | — | 0.53 | — | — | — | Bal. |
| 11 | 34.4 | 5.7 | 15.8 | 4.7 | 2.0 | — | — | — | — | Bal. |
| 12 | 34.8 | 5.8 | 15.9 | 4.8 | — | 4.9 | — | — | — | Bal. |

Bal.: Balance
HD: 600~700° C.
DR: 600~700° C.

TABLE 2

| Sample No. | Hydrogen Absorption Rate (wt %/sec) | Hydrogen Desorption Rate (wt. %/sec) | Electric Discharge Capacity (mAh/g) | Electric Charge and Discharge Cycles (times) |
|---|---|---|---|---|
| 1 | 0.20 | 0.19 | 401 | 2 |
| 2 | 0.21 | 0.20 | 419 | 1 |
| 3 | 0.19 | 0.19 | 421 | 2 |
| 4 | 0.21 | 0.21 | 419 | 2 |
| 5 | 0.19 | 0.19 | 417 | 1 |
| 6 | 0.19 | 0.20 | 418 | 2 |
| 7 | 0.18 | 0.19 | 420 | 2 |
| 8 | 0.21 | 0.20 | 416 | 2 |
| 9 | 0.17 | 0.18 | 425 | 4 |
| 10 | 0.17 | 0.17 | 423 | 4 |
| 11 | 0.19 | 0.20 | 422 | 3 |
| 12 | 0.22 | 0.21 | 419 | 2 |

HD: 600 ~ 700° C.
DR: 600 ~ 700° C.

TABLE 3

| Sample No. | Component Composition (wt %) | | | | | | | | | Ni + impurity |
|---|---|---|---|---|---|---|---|---|---|---|
| | Zr | Ti | Mn | V | Rare Earth Elements | | | | | |
| | | | | | La | Ce | Pr | Nd | Hf | |
| 13 | 35.7 | 6.2 | 16.3 | 5.1 | 2.4 | 2.6 | — | — | — | Bal. |
| COM-1 | 21.8 | 12.9 | 24.7 | — | 3.8 | Cr: 23.5 | — | — | — | Bal. |
| 14 | 25.0 | 6.2 | 15.9 | 4.9 | 1.5 | 1.7 | — | — | 1.5 | Bal. |
| 15 | 29.9 | 6.1 | 15.9 | 5.0 | 1.6 | 1.6 | — | — | 1.6 | Bal. |
| 16 | 34.0 | 5.9 | 16.2 | 5.0 | 3.0 | — | — | — | 1.4 | Bal. |
| 17 | 36.7 | 5.2 | 16.1 | 5.2 | 1.0 | 2.3 | — | — | 1.4 | Bal. |
| 18 | 34.3 | 10.2 | 15.8 | 4.9 | 3.1 | — | — | — | 1.6 | Bal. |
| 19 | 34.4 | 5.9 | 10.2 | 5.3 | 3.3 | — | — | — | 1.3 | Bal. |
| 20 | 34.5 | 6.3 | 19.5 | 5.0 | 1.8 | 1.3 | — | — | 1.5 | Bal. |
| 21 | 34.2 | 6.2 | 15.8 | 2.5 | — | 3.2 | — | — | 1.2 | Bal. |
| 22 | 34.6 | 5.8 | 15.7 | 8.1 | 3.3 | — | — | — | 1.3 | Bal. |
| 23 | 34.4 | 5.7 | 16.3 | 11.8 | 1.6 | 1.7 | — | — | 1.4 | Bal. |
| 24 | 34.5 | 6.0 | 15.9 | 4.9 | 0.5 | — | — | — | 1.2 | Bal. |

COM: Comparative
Bal.: Balance
HD: 600~700° C.
DR: 600~700° C.

TABLE 4

| Sample No. | Hydrogen Absorption Rate (wt %/sec) | Hydrogen Desorption Rate (wt. %/sec) | Electric Discharge Capacity (mAh/g) | Electric Charge and Discharge Cycles (times) |
|---|---|---|---|---|
| 13 | 0.22 | 0.23 | 418 | 2 |
| COM-1 | 0.08 | 0.07 | 360 | 20 |
| 14 | 0.19 | 0.18 | 387 | 1 |
| 15 | 0.19 | 0.20 | 403 | 1 |
| 16 | 0.20 | 0.21 | 420 | 2 |
| 17 | 0.21 | 0.18 | 419 | 2 |
| 18 | 0.19 | 0.19 | 422 | 2 |
| 19 | 0.21 | 0.18 | 418 | 2 |
| 20 | 0.20 | 0.19 | 419 | 1 |
| 21 | 0.21 | 0.20 | 411 | 2 |
| 22 | 0.18 | 0.18 | 420 | 1 |
| 23 | 0.19 | 0.19 | 423 | 1 |
| 24 | 0.17 | 0.16 | 424 | 4 |

COM: Comparative
HD: 600 ~ 700° C.
DR: 600 ~ 700° C.

TABLE 5

| Sample No. | Component Composition (wt %) | | | | | | | | | Ni + impurity |
|---|---|---|---|---|---|---|---|---|---|---|
| | Zr | Ti | Mn | V | Rare Earth Elements | | | | Hf | |
| | | | | | La | Ce | Pr | Nd | | |
| 25 | 34.4 | 5.9 | 16.2 | 5.1 | 2.0 | — | — | — | 1.4 | Bal. |
| 26 | 34.4 | 6.1 | 16.1 | 5.2 | 4.6 | — | — | — | 1.6 | Bal. |
| 27 | 34.3 | 6.2 | 16.0 | 4.9 | — | 1.5 | — | — | 1.3 | Bal. |
| 28 | 34.2 | 5.7 | 15.7 | 4.8 | — | 4.8 | — | — | 1.5 | Bal. |
| 29 | 34.1 | 6.1 | 15.8 | 5.0 | 3.2 | — | — | — | 0.12 | Bal. |
| 30 | 34.6 | 6.0 | 16.1 | 5.3 | — | 2.9 | — | — | 0.63 | Bal. |
| 31 | 34.3 | 6.0 | 16.0 | 5.2 | 1.6 | 1.5 | — | — | 0.59 | Bal. |
| 32 | 34.2 | 6.1 | 15.9 | 4.9 | 3.1 | — | — | — | 1.9 | Bal. |
| COM-2 | 21.0 | 12.6 | 24.9 | Cr: 23.5 | — | 3.3 | — | — | — | Bal. |
| 33 | 25.2 | 6.1 | 16.1 | 5.1 | 2.1 | 0.8 | — | — | — | Bal. |
| 34 | 30.1 | 6.2 | 15.8 | 5.0 | — | 3.3 | — | — | — | Bal. |
| 35 | 34.3 | 5.6 | 16.0 | 4.9 | 3 | — | — | — | — | Bal. |
| 36 | 36.9 | 5.1 | 16.2 | 5.0 | 1.6 | 1.4 | — | — | — | Bal. |

COM: Comparative
Bal.: Balance
HD: 600~700° C.
DR: 600~700° C.

TABLE 6

| Sample No. | Hydrogen Absorption Rate (wt %/sec) | Hydrogen Desorption Rate (wt. %/sec) | Electric Discharge Capacity (mAh/g) | Electric Charge and Discharge Cycles (times) |
|---|---|---|---|---|
| 25 | 0.20 | 0.19 | 423 | 3 |
| 26 | 0.25 | 0.24 | 415 | 1 |
| 27 | 0.19 | 0.20 | 422 | 3 |
| 28 | 0.25 | 0.24 | 413 | 1 |
| 29 | 0.20 | 0.21 | 421 | 1 |
| 30 | 0.20 | 0.19 | 420 | 1 |
| 31 | 0.21 | 0.19 | 419 | 2 |
| 32 | 0.20 | 0.20 | 421 | 1 |
| COM-2 | 0.08 | 0.08 | 360 | 17 |
| 33 | 0.20 | 0.20 | 383 | 2 |
| 34 | 0.20 | 0.19 | 401 | 2 |
| 35 | 0.21 | 0.20 | 410 | 2 |
| 36 | 0.19 | 0.19 | 411 | 2 |

COM: Comparative
HD: 600 ~ 700° C.
DR: 600 ~ 700° C.

TABLE 7

| Sample No. | Component Composition (wt %) | | | | | | | | | Ni + impurity |
|---|---|---|---|---|---|---|---|---|---|---|
| | Zr | Ti | Mn | V | Rare Earth Elements | | | | Hf | |
| | | | | | La | Ce | Pr | Nd | | |
| 37 | 40.2 | 5.7 | 16.0 | 5.1 | 3.2 | — | — | — | — | Bal. |
| 38 | 44.8 | 5.6 | 15.9 | 4.8 | 2.3 | 0.5 | — | — | — | Bal. |
| 39 | 35.0 | 1.1 | 15.8 | 5.0 | — | 3 | — | — | — | Bal. |
| 40 | 34.7 | 4.1 | 16.0 | 4.9 | 1.7 | 1.6 | — | — | — | Bal. |
| 41 | 34.4 | 9.8 | 15.9 | 5.1 | 2.9 | — | — | — | — | Bal. |
| 42 | 34.6 | 11.9 | 16.1 | 4.8 | — | 3.1 | — | — | — | Bal. |
| 43 | 34.9 | 5.9 | 10.4 | 4.7 | 2.8 | — | — | — | — | Bal. |
| 44 | 34.1 | 6.2 | 17.9 | 4.9 | — | 3.1 | — | — | — | Bal. |
| 45 | 35.3 | 5.8 | 19.8 | 5.1 | — | 3.5 | — | — | — | Bal. |
| 46 | 34.6 | 6.0 | 16.2 | 2.8 | 1.6 | 1.3 | — | — | — | Bal. |
| 47 | 34.5 | 6.2 | 15.9 | 8.0 | 2.9 | 0.3 | — | — | — | Bal. |

TABLE 7-continued

| | Component Composition (wt %) | | | | | | | | | |
|---|---|---|---|---|---|---|---|---|---|---|
| | | | | | Rare Earth Elements | | | | | Ni + |
| Sample No. | Zr | Ti | Mn | V | La | Ce | Pr | Nd | Hf | impurity |
| 48 | 34.7 | 6.1 | 16.0 | 11.9 | 3.1 | — | — | — | — | Bal. |
| 49 | 34.2 | 5.8 | 16.0 | 5.2 | 0.54 | — | — | — | — | Bal. |

Bal.: Balance
HD: 600~700° C.
DR: 600~700° C.

TABLE 8

| Sample No. | Hydrogen Absorption Rate (wt %/sec) | Hydrogen Desorption Rate (wt. %/sec) | Electric Discharge Capacity (mAh/g) | Electric Charge and Discharge Cycles (times) |
|---|---|---|---|---|
| 37 | 0.21 | 0.20 | 411 | 2 |
| 38 | 0.19 | 0.20 | 401 | 2 |
| 39 | 0.21 | 0.20 | 394 | 2 |
| 40 | 0.20 | 0.21 | 407 | 2 |
| 41 | 0.21 | 0.21 | 405 | 2 |
| 42 | 0.19 | 0.19 | 393 | 2 |
| 43 | 0.19 | 0.19 | 400 | 2 |
| 44 | 0.19 | 0.20 | 406 | 2 |
| 45 | 0.18 | 0.19 | 400 | 2 |
| 46 | 0.21 | 0.20 | 400 | 2 |
| 47 | 0.20 | 0.19 | 413 | 2 |
| 48 | 0.20 | 0.21 | 395 | 2 |
| 49 | 0.17 | 0.18 | 416 | 4 |

HD: 600 ~ 700° C.
DR: 600 ~ 700° C.

TABLE 10

| Sample No. | Hydrogen Absorption Rate (wt %/sec) | Hydrogen Desorption Rate (wt. %/sec) | Electric Discharge Capacity (mAh/g) | Electric Charge and Discharge Cycles (times) |
|---|---|---|---|---|
| 50 | 0.17 | 0.17 | 415 | 4 |
| 51 | 0.19 | 0.20 | 412 | 2 |
| 52 | 0.22 | 0.21 | 407 | 1 |
| 53 | 0.22 | 0.23 | 408 | 1 |
| COM-3 | 0.07 | 0.07 | 349 | 18 |
| 54 | 0.19 | 0.18 | 385 | 2 |
| 55 | 0.19 | 0.20 | 406 | 2 |
| 56 | 0.20 | 0.21 | 414 | 2 |
| 57 | 0.21 | 0.18 | 416 | 2 |
| 58 | 0.20 | 0.21 | 415 | 2 |
| 59 | 0.21 | 0.20 | 405 | 2 |
| 60 | 0.19 | 0.18 | 396 | 2 |

COM: Comparative
HD: 600 ~ 700° C.
DR: 600 ~ 700° C.

TABLE 9

| | Component Composition (wt %) | | | | | | | | | |
|---|---|---|---|---|---|---|---|---|---|---|
| | | | | | Rare Earth Elements | | | | | Ni + |
| Sample No. | Zr | Ti | Mn | V | La | Ce | Pr | Nd | Hf | impurity |
| 50 | 34.1 | 5.9 | 15.9 | 4.9 | — | 0.53 | — | — | — | Bal. |
| 51 | 34.4 | 5.7 | 15.8 | 4.7 | 2 | — | — | — | — | Bal. |
| 52 | 34.8 | 5.8 | 15.9 | 4.8 | — | 4.9 | — | — | — | Bal. |
| 53 | 35.7 | 6.2 | 16.3 | 5.1 | 2.4 | 2.6 | — | — | — | Bal. |
| COM-3 | 23.8 | 12.5 | 24.1 | Cr: 22.9 | 3.8 | — | — | — | — | Bal. |
| 54 | 25.0 | 6.2 | 15.9 | 4.9 | 1.5 | 1.7 | — | — | 1.5 | Bal. |
| 55 | 29.9 | 6.1 | 15.9 | 5.0 | 1.6 | 1.6 | — | — | 1.6 | Bal. |
| 56 | 34.0 | 5.9 | 16.2 | 5.0 | 3.0 | — | — | — | 1.4 | Bal. |
| 57 | 36.7 | 5.2 | 16.1 | 5.2 | 1.0 | 2.3 | — | — | 1.4 | Bal. |
| 58 | 40.0 | 5.9 | 16.0 | 4.9 | 2.0 | 1.2 | — | — | 1.5 | Bal. |
| 59 | 44.8 | 5.5 | 15.8 | 4.8 | — | 2.9 | — | — | 1.2 | Bal. |
| 60 | 34.1 | 1.0 | 16.1 | 5.0 | 1.7 | 1.5 | — | — | 1.4 | Bal. |

COM: Comparative
Bal.: Balance
HD: 600~700° C.
DR: 600~700° C.

TABLE 11

| Sample No. | Component Composition (wt %) | | | | | | | | | |
|---|---|---|---|---|---|---|---|---|---|---|
| | Zr | Ti | Mn | V | Rare Earth Elements | | | | | Ni + impurity |
| | | | | | La | Ce | Pr | Nd | Hf | |
| 61 | 34.2 | 4.1 | 15.9 | 5.0 | 1.6 | 1.6 | — | — | 1.3 | Bal. |
| 62 | 34.3 | 10.2 | 15.8 | 4.9 | 3.1 | — | — | — | 1.6 | Bal. |
| 63 | 34.0 | 11.9 | 16.0 | 5.0 | — | 3.2 | — | — | 1.3 | Bal. |
| 64 | 34.4 | 5.9 | 10.2 | 5.3 | 3.3 | — | — | — | 1.3 | Bal. |
| 65 | 34.5 | 6.3 | 19.5 | 5.0 | 1.8 | 1.3 | — | — | 1.5 | Bal. |
| 66 | 34.2 | 6.2 | 15.8 | 2.5 | — | 3.2 | — | — | 1.2 | Bal. |
| 67 | 34.6 | 5.8 | 15.7 | 8.1 | 3.3 | — | — | — | 1.3 | Bal. |
| 68 | 34.4 | 5.7 | 16.3 | 11.8 | 1.6 | 1.7 | — | — | 1.4 | Bal. |
| 69 | 34.5 | 6.0 | 15.9 | 4.9 | 0.5 | — | — | — | 1.2 | Bal. |
| 70 | 34.4 | 5.9 | 16.2 | 5.1 | 2.0 | — | — | — | 1.4 | Bal. |
| 71 | 34.4 | 6.1 | 16.1 | 5.2 | 4.6 | — | — | — | 1.6 | Bal. |
| 72 | 34.6 | 5.8 | 16.0 | 5.0 | — | 0.5 | — | — | 1.4 | Bal. |

Bal.: Balance
HD: 600~700° C.
DR: 600~700° C.

TABLE 12

| Sample No. | Hydrogen Absorption Rate (wt %/sec) | Hydrogen Desorption Rate (wt. %/sec) | Electric Discharge Capacity (mAh/g) | Electric Charge and Discharge Cycles (times) |
|---|---|---|---|---|
| 61 | 0.18 | 0.19 | 411 | 2 |
| 62 | 0.19 | 0.19 | 407 | 2 |
| 63 | 0.18 | 0.18 | 397 | 2 |
| 64 | 0.21 | 0.18 | 404 | 2 |
| 65 | 0.20 | 0.19 | 406 | 2 |
| 66 | 0.21 | 0.20 | 401 | 2 |
| 67 | 0.18 | 0.18 | 417 | 2 |
| 68 | 0.19 | 0.19 | 399 | 2 |
| 69 | 0.17 | 0.16 | 420 | 4 |
| 70 | 0.20 | 0.19 | 417 | 2 |
| 71 | 0.25 | 0.24 | 413 | 1 |
| 72 | 0.16 | 0.17 | 420 | 4 |

HD: 600 ~ 700° C.
DR: 600 ~ 700° C.

TABLE 13

| Sample No. | Component Composition (wt %) | | | | | | | | | |
|---|---|---|---|---|---|---|---|---|---|---|
| | Zr | Ti | Mn | V | Rare Earth Elements | | | | | Ni + impurity |
| | | | | | La | Ce | Pr | Nd | Hf | |
| 73 | 34.3 | 6.2 | 16.0 | 4.9 | — | 1.5 | — | — | 1.3 | Bal. |
| 74 | 34,2 | 5.7 | 15.7 | 4.8 | — | 4.8 | — | — | 1.5 | Bal. |
| 75 | 34.1 | 6.1 | 15.8 | 5.0 | 3.2 | — | — | — | 0.12 | Bal. |
| 76 | 34.6 | 6.0 | 16.1 | 5.3 | — | 2.9 | — | — | 0.63 | Bal. |
| 77 | 34.3 | 6.0 | 16.0 | 5.2 | 1.6 | 1.5 | — | — | 0.59 | Bal. |
| 78 | 34.2 | 6.1 | 15.9 | 4.9 | 3.1 | — | — | — | 1.9 | Bal. |
| 79 | 34.1 | 5.8 | 16.1 | 4.9 | 1.6 | 1.6 | — | — | 2.6 | Bal. |
| 80 | 33.9 | 6.0 | 16.3 | 5.1 | 3.0 | — | — | — | 3.9 | Bal. |
| 81 | 34.7 | 6.1 | 16.0 | 5.0 | 0.13 | 0.26 | 0.03 | 0.09 | 1.0 | Bal. |
| 82 | 34.6 | 5.8 | 15.8 | 5.0 | 0.21 | 0.19 | 0.13 | — | 1.1 | Bal. |
| 83 | 34.5 | 6.0 | 16.1 | 5.3 | 0.29 | — | 0.24 | — | 0.9 | Bal. |
| 84 | 34.2 | 6.1 | 16.1 | 5.0 | 0.43 | 0.05 | 0.10 | 0.39 | 1.2 | Bal. |

Bal.: Balance
HD: 600~700° C.
DR: 600~700° C.

TABLE 14

| Sample No. | Hydrogen Absorption Rate (wt %/sec) | Hydrogen Desorption Rate (wt. %/sec) | Electric Discharge Capacity (mAh/g) | Electric Charge and Discharge Cycles (times) |
|---|---|---|---|---|
| 73 | 0.19 | 0.20 | 418 | 2 |
| 74 | 0.25 | 0.24 | 411 | 1 |
| 75 | 0.20 | 0.21 | 411 | 2 |
| 76 | 0.20 | 0.19 | 414 | 2 |
| 77 | 0.21 | 0.19 | 413 | 2 |
| 78 | 0.20 | 0.20 | 415 | 2 |
| 79 | 0.21 | 0.20 | 414 | 2 |
| 80 | 0.20 | 0.21 | 411 | 2 |
| 81 | 0.18 | 0.16 | 420 | 4 |
| 82 | 0.18 | 0.18 | 420 | 4 |
| 83 | 0.18 | 0.18 | 420 | 4 |
| 84 | 0.20 | 0.17 | 419 | 3 |

HD: 600 ~ 700° C.
DR: 600 ~ 700° C.

TABLE 15

| | Component Composition (wt %) | | | | | | | | | |
|---|---|---|---|---|---|---|---|---|---|---|
| | | | | | Rare Earth Elements | | | | | Ni + |
| Sample No. | Zr | Ti | Mn | V | La | Ce | Pr | Nd | Hf | impurity |
| 85 | 34.3 | 5.9 | 15.8 | 5.1 | 0.42 | 0.30 | — | 0.48 | 1.1 | Bal. |
| 86 | 34.6 | 5.8 | 15.8 | 4.9 | 0.56 | — | — | 0.45 | 1.1 | Bal. |
| 87 | 34.4 | 6.2 | 15.8 | 4.8 | 1.27 | 0.14 | 0.44 | 0.14 | 1.1 | Bal. |
| 88 | 34.3 | 5.8 | 15.9 | 5.2 | 0.57 | — | 0.92 | 0.80 | 1.2 | Bal. |
| 89 | 34.5 | 5.9 | 15.9 | 5.0 | — | 1.53 | 0.51 | — | 1.1 | Bal. |
| 90 | 34.3 | 6.1 | 16.1 | 4.9 | 3.80 | 0.10 | 0.24 | 0.48 | 1.1 | Bal. |
| 91 | 34.3 | 5.9 | 15.8 | 5.2 | — | 1.90 | 1.60 | 1.20 | 1.1 | Bal. |
| 92 | 34.5 | 6.1 | 15.8 | 5.3 | — | 2.60 | — | 2.10 | 1.0 | Bal. |
| COM-4 | 23.8 | 12.5 | 24.1 | Cr: 22.9 | 3.8 | — | — | — | — | Bal. |
| 93 | 35.2 | 6.0 | 15.9 | 4.8 | 1.7 | 1.5 | — | — | — | Bal. |
| 94 | 34.8 | 5.9 | 16.1 | 4.9 | 1.25 | 0.14 | 0.45 | 0.15 | — | Bal. |
| 95 | 34.1 | 5.8 | 15.8 | 4.8 | 1.8 | 1.2 | — | — | 1.1 | Bal. |
| 96 | 34.9 | 5.7 | 16.2 | 4.9 | 1.26 | 0.15 | 0.15 | 0.15 | 1.2 | Bal. |

COM: Comparative
Bal.: Balance
HD: 600~700° C.
DR: 600~700° C.

TABLE 16

| Sample No. | Hydrogen Absorption Rate (wt %/sec) | Hydrogen Desorption Rate (wt. %/sec) | Electric Discharge Capacity (mAh/g) | Electric Charge and Discharge Cycles (times) |
|---|---|---|---|---|
| 85 | 0.20 | 0.19 | 419 | 3 |
| 86 | 0.19 | 0.18. | 419 | 3 |
| 87 | 0.19 | 0.19 | 416 | 2 |
| 88 | 0.20 | 0.20 | 417 | 2 |
| 89 | 0.21 | 0.19 | 417 | 2 |
| 90 | 0.23 | 0.23 | 411 | 1 |
| 91 | 0.22 | 0.23 | 412 | 1 |
| 92 | 0.22 | 0.22 | 412 | 1 |
| COM-4 | 0.07 | 0.07 | 349 | 18 |
| 93 | 0.21 | 0.20 | 419 | 2 |
| 94 | 0.20 | 0.21 | 420 | 2 |
| 95 | 0.21 | 0.20 | 419 | 2 |
| 96 | 0.21 | 0.21 | 419 | 2 |

COM: Comparative
HD: 600 ~ 700° C.
DR: 600 ~ 700° C.

TABLE 18

| Sample No. | Hydrogen Absorption Rate (wt %/sec) | Hydrogen Desorption Rate (wt. %/sec) | Electric Discharge Capacity (mAh/g) | Electric Charge and Discharge Cycles (times) |
|---|---|---|---|---|
| 97 | 0.19 | 0.19 | 410 | 2 |
| 98 | 0.20 | 0.21 | 420 | 1 |
| 99 | 0.21 | 0.21 | 418 | 1 |
| 100 | 0.21 | 0.20 | 408 | 1 |
| 101 | 0.19 | d.#9 | 409 | 1 |
| 102 | 0.22 | 0.20 | 421 | 1 |
| 103 | 0.20 | 0.21 | 415 | 1 |
| 104 | 0.21 | 0.19 | 407 | 2 |
| 105 | 0.19 | 0.18 | 405 | 2 |
| 106 | 0.19 | 0.20 | 415 | 1 |
| 107 | 0.20 | 0.19 | 418 | 1 |
| 108 | 0.18 | 0.19 | 410 | 2 |

HD: 200 ~ 950° C. (preferably 400 ~ 900° C.)
DR: 500 ~ 900° C. (preferably 550 ~ 850° C.)

TABLE 17

| | Component Composition (wt %) | | | | | | | | | | | |
|---|---|---|---|---|---|---|---|---|---|---|---|---|
| | | | | | Rare Earth Elements | | | | | Ni + | Hydrogenation | Dehydrogenation |
| Sample No. | Zr | Ti | Mn | V | La | Ce | Pr | Nd | Hf | impurity | temp. (° C.) | temp. (° C.) |
| 97 | 34.3 | 5.6 | 16.0 | 4.9 | 3.0 | — | — | — | — | Bal. | 200 | 500 |
| 98 | 34.3 | 5.6 | 16.0 | 4.9 | 3.0 | — | — | — | — | Bal. | 400 | 550 |
| 99 | 34.3 | 5.6 | 16.0 | 4.9 | 3.0 | — | — | — | — | Bal. | 900 | 850 |
| 100 | 34.3 | 5.6 | 16.0 | 4.9 | 3.0 | — | — | — | — | Bal. | 950 | 900 |
| 101 | 34.0 | 5.9 | 16.2 | 5.0 | 3.0 | — | — | — | 1.4 | Bal. | 200 | 500 |
| 102 | 34.0 | 5.9 | 16.2 | 5.0 | 3.0 | — | — | — | 1.4 | Bal. | 400 | 550 |
| 103 | 34.0 | 5.9 | 16.2 | 5.0 | 3.0 | — | — | — | 1.4 | Bal. | 900 | 850 |
| 104 | 34.0 | 5.9 | 16.2 | 5.0 | 3.0 | — | — | — | 1.4 | Bal. | 950 | 900 |
| 105 | 34.4 | 6.2 | 15.8 | 4.8 | 1.3 | 0.14 | 0.44 | 0.14 | 1.1 | Bal. | 200 | 500 |
| 106 | 34.4 | 6.2 | 15.8 | 4.8 | 1.3 | 0.14 | 0.44 | 0.14 | 1.1 | Bal. | 400 | 550 |
| 107 | 34.4 | 6.2 | 15.8 | 4.8 | 1.3 | 0.14 | 0.44 | 0.14 | 1.1 | Bal. | 900 | 850 |
| 108 | 34.4 | 6.2 | 15.8 | 4.8 | 1.3 | 0.14 | 0.44 | 0.14 | 1.1 | Bal. | 950 | 900 |

Bal.: Balance
HD: 200~950° C. (preferably 400~900° C.)
DR: 500~900° C. (preferably 550~850° C.)

TABLE 19

| Sample No. | Component Composition (wt %) | | | | | | | | | | Hydrogenation temp. (° C.) | Dehydrogenation temp. (° C.) |
|---|---|---|---|---|---|---|---|---|---|---|---|---|
| | Zr | Ti | Mn | V | Rare Earth Elements | | | | | Ni + impurity | | |
| | | | | | La | Ce | Pr | Nd | Hf | | | |
| 109 | 34.8 | 5.9 | 16.1 | 4.9 | 1.3 | 0.14 | 0.45 | 0.15 | — | Bal. | 200 | 500 |
| 110 | 3438 | 5.9 | 16.1 | 4.9 | 1.3 | 0.14 | 0.45 | 0.15 | — | Bal. | 400 | 550 |
| 111 | 34.8 | 5.9 | 16.1 | 4.9 | 1.3 | 0.14 | 0.45 | 0.15 | — | Bal. | 900 | 550 |
| 112 | 34.8 | 5.9 | 16.1 | 4.9 | 1.3 | 0.14 | 0.45 | 0.15 | — | Bal. | 950 | 900 |

Bal.: Balance
HD: 200~950° C. (preferably 400~900° C.)
DR: 500~900° C. (preferably 550~850° C.)

TABLE 20

| Sample No. | Hydrogen Absorption Rate (wt %/sec) | Hydrogen Desorption Rate (wt. %/sec) | Electric Discharge Capacity (mAh/g) | Electric Charge and Discharge Cycles (times) |
|---|---|---|---|---|
| 109 | 0.20 | 0.18 | 405 | 2 |
| 110 | 0.21 | 0.20 | 422 | 1 |
| 111 | 0.21 | 0.21 | 417 | 1 |
| 112 | 0.19 | 0.18 | 406 | 2 |

HD: 200 ~ 950° C. (preferably 400 ~ 900° C.)
DR: 500 ~ 900° C. (preferably 550 ~ 850° C.)

We claim:

1. A hydrogen occluding alloy having a composition comprising, by wt %:
   25 to 45% of Zr, 1 to 12% of Ti,
   10 to 20% of Mn, 2 to 12% of V,
   0.5% to 5% of at least one rare earth element, unavoidable impurities, and at least 25% of Ni, having a structure comprising main phase made of Zr—Ni—Mn based alloy and having cracks, and a phase made of a regenerated rare earth element-Ni type alloy expansively distributed along said cracks.

2. A hydrogen occluding alloy as recited in claim 1, wherein said composition comprises by wt %:
   25 to 40% of Zr, 4 to 12% of Ti,
   10 to 20% of Mn, 2 to 8% of V,
   0.5 to 5% of at least one rare earth element, unavoidable impurities, and at least 25% of Ni.

3. A hydrogen occluding alloy as recited in claim 1, wherein said composition consists essentially of, by wt %:
   30 to 37% of Zr, 5 to 10% of Ti,
   14 to 18% of Mn, 3 to 6% of V,
   2 to 4% of La and/or Ce,
   unavoidable impurities,
   and at least 25% of Ni.

4. A hydrogen occluding alloy as recited in claim 1, wherein said composition further comprises 0.1–4.0 weight percent of Hf.

5. A hydrogen occluding alloy as recited in claim 2, wherein said composition further comprises 0.1–2.0 weight percent of Hf.

6. A hydrogen occluding alloy as recited in claim 3, wherein said composition further comprises 1.0–1.7 weight percent of Hf.

7. A hydrogen occluding alloy as recited in claim 1, wherein said at least one rare earth element comprises La and/or Ce.

8. A hydrogen occluding alloy as recited in claim 2, wherein said at least one rare earth element comprises La and/or Ce.

9. A hydrogen occluding alloy as recited in claim 4, wherein said at least one rare earth element comprises La and/or Ce.

10. An electrode for a Ni-hydrogen battery, said electrode comprising a hydrogen occluding alloy as recited in claim 1.

11. An alloy comprising main phase made of Zr—Ni—Mn based alloy and having cracks, and a rare earth element-Ni type alloy expansively distributed in said cracks.

12. A hydrogen occluding alloy formed according to a process comprising:
   (a) preparing an alloy ingot having a composition comprising, by weight:
      25 to 45% of Zr, 1 to 12% of Ti,
      10 to 20% of Mn, 2 to 12% of V,
      0.5% to 5% of at least one rare earth element, unavoidable impurities, and at least 25% of Ni,
   (b) homogenizing said ingot in a non-oxidizing atmosphere to provide a structure including Zr—Ni—Mn based alloy and rare earth-Ni type alloy,
   (c) hydrogenating said ingot in a hydrogen atmosphere at a temperature in the range of from 200° C. to 950° C., thereby forming cracks in said Zr—Ni—Mn based alloy and converting at least some of said rare earth-Ni type alloy to rare earth element hydride, and
   (d) dehydrogenating said ingot at a temperature in the range of from 500° C. to 900° C., thereby regenerating and fluidizing a rare earth element-Ni type alloy which flows along said cracks.

* * * * *